(12) United States Patent
Kalck et al.

(10) Patent No.: US 6,291,579 B1
(45) Date of Patent: Sep. 18, 2001

(54) AQUEOUS POWDER-PAINT DISPERSION

(75) Inventors: Ulrich Kalck; Joachim Woltering, both of Münster; Maximilian Bendix, Oelde; Heike Schuchmann, Vaihingen/Enz; Klaus Borho, Mutterstadt; Werner Weinle, Friedelsheim; Michael Schiessl, Hasslach; Sven Rück, Worms; Markus Antonietti, Marburg-Schröck, all of (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/331,271

(22) PCT Filed: Dec. 18, 1997

(86) PCT No.: PCT/EP97/07109

§ 371 Date: Jul. 27, 1999

§ 102(e) Date: Jul. 27, 1999

(87) PCT Pub. No.: WO98/27141

PCT Pub. Date: Jun. 25, 1998

(30) Foreign Application Priority Data

Dec. 18, 1996 (DE) ............................................. 196 52 813

(51) Int. Cl.⁷ .................................................... C08L 31/06
(52) U.S. Cl. ............................................................. 524/832
(58) Field of Search .............................................. 524/832

(56) References Cited

U.S. PATENT DOCUMENTS

| | | |
|---|---|---|
| 3,737,401 | 6/1973 | Tsou et al. . |
| 3,787,230 | 1/1974 | Hoffman et al. ................. 117/102 A |
| 4,122,055 | 10/1978 | Tugukuni et al. . |
| 4,268,542 | 5/1981 | Sakakibara et al. . |
| 4,385,138 | 5/1983 | Sagane et al. . |
| 4,477,530 | 10/1984 | Diefenbach et al. . |
| 4,510,275 | 4/1985 | Ihikura et al. . |
| 4,686,249 | 8/1987 | Diefenbach et al. . |
| 5,055,524 | 10/1999 | Pettit, Jr. et al. .................... 525/172 |
| 5,379,947 | 1/1995 | Williams et al. . |

FOREIGN PATENT DOCUMENTS

| | | | |
|---|---|---|---|
| 756 693 | 3/1971 | (BT) . | |
| 21 40 843 | 8/1971 | (DE) | ............... C09B/67/00 |
| 22 14 650 B2 | 3/1972 | (DE) | ............... C09D/3/80 |
| 26 01 618 A1 | 1/1976 | (DE) | ............... C09D/3/68 |
| 27 16 118 A1 | 4/1977 | (DE) | ............... B05D/7/16 |
| 27 49 576 B2 | 5/1977 | (DE) | ............... C98F/220/18 |
| 29 03 022 A1 | 1/1979 | (DE) | ............... C09D/3/64 |
| 0 153 679 A2 | 2/1985 | (EP) | ............... C08L/61/24 |
| 0 299 420 A2 | 12/1988 | (EP) | ............... C09D/3/58 |
| WO 95/28448 | 4/1994 | (EP) | ............... C09D/5/03 |
| WO 96/32452 | 4/1995 | (EP) | ............... C09D/133/06 |
| WO 96/37561 | 11/1996 | (EP) | ............... C09D/5/00 |
| 2007192 | 1/1970 | (FR) | ............... C08J/1/00 |
| 22 30 699 | 3/1974 | (FR) | ............... C09D/3/48 |
| 1466292 * | 3/1977 | (GB) . | |

* cited by examiner

*Primary Examiner*—Edward J. Cain

(57) ABSTRACT

The invention relates to a process for preparing an aqueous powder coating dispersion, which comprises introducing a liquid melt comprising binders and crosslinking agents and also, if desired, catalysts, auxiliaries and further additives such as devolatilizers, UV absorbers, free-radical scavengers and/or antioxidants into an emulsifying apparatus, preferably with the addition of water and stabilizers, and cooling and filtering the resultant emulsion.

12 Claims, 2 Drawing Sheets

Colloid mills (wet rotor mills)

Toothed    Smoothed

Surfaces of the rotor and stator

Crown gear dispersers/intensive mixers

Radial product flow

Axial product flow

High-pressure homogenisers

With conveying elements

Standard    Opposed jet principle

AQUEOUS POWDER-PAINT DISPERSION

Figure 1:
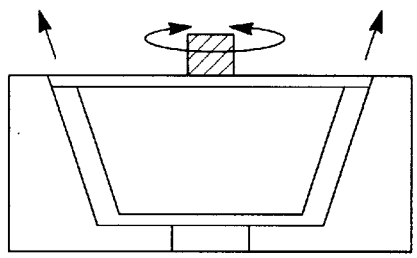
Figure 1:
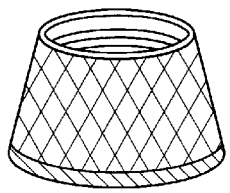
Figure 1:
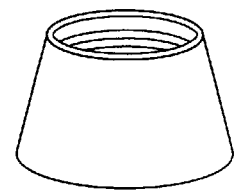
Figure 1:
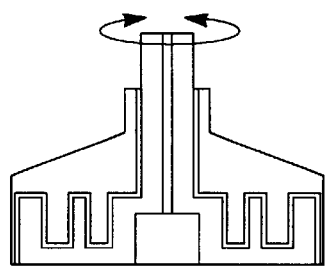
Figure 1:
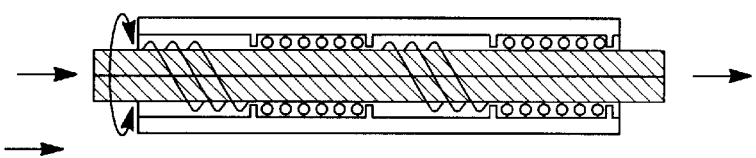
Figure 1:
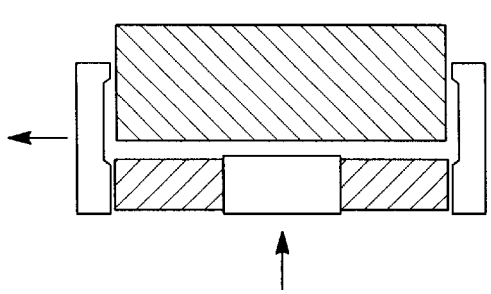
Figure 1:
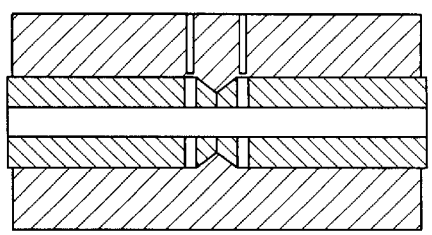

The present invention relates to an aqueous powder coating dispersion which is particularly suitable as a coating for car bodies which have been coated with water-based paint.

For the coating of car bodies, preference is currently given to the use of liquid coating materials. These cause numerous environmental problems owing to their solvent content. The same applies to cases where water-based coating materials are employed.

Entirely solvent-free emulsion paints have been used to date only in areas of application (for example, as wall paints in architectural preservation) which impose relatively low requirements on the resulting surface properties. Where the coating is required to meet very stringent optical and mechanical requirements, as in the case of coil coating or automotive topcoats, for example, the complete renunciation of organic solvents is at present impossible. Therefore, many water-based coating materials have a residual organic solvent content in the range from 10 to 20% and should therefore really be referred to as solvent-reduced coating systems.

For this reason, increased efforts hare been made in recent years to use powder coating materials for the coating operation. The results so far, however, are not satisfactory; in particular, increased coat thicknesses are necessary in order to achieve a uniform appearance. Furthermore, powder-based coating films are still not at an optimum in terms of their optical properties, such as leveling and gloss, and the technomechanical properties such as chemical resistance, weather resistance and water drop resistance. In addition, the crosslinking reactions which are suitable for the line conditions of powder coatings in the automotive segment in some cases exhibit weaknesses in chemical resistance and scratch resistance.

On the other hand, the use of pulverulent coating materials entails a different application technology, so that special coating equipment is required for these materials. Consequently, integrating powder coating technology into existing coating lines is often economically unprofitable and so delays the change to solvent-free coating systems until the entire coating plant is made the subject of new installation. At present, owing to the relatively large particle size of about 25 $\mu$m, it is almost impossible using powder coating technology to produce coating films having a coat thickness of less than 50 $\mu$m.

The plants set up for liquid coating materials cannot be used for powder coating materials. On the other hand, liquid coating materials have the disadvantages set out above. In particular, the more environment-friendly, aqueous coating systems constitute merely a compromise between solvent content and coating quality. An improvement in the film properties can in may cases be obtained only at the expense of a higher solvent content. Therefore, the attempt is being made to develop powder coatings in the form of aqueous dispersions which can be processed using liquid coating technologies (U.S. Pat. No. 3,737,401, U.S. Pat. No. 3,787,230, DE-B 2 601 618, DE-A 2 140 843, DE 2 716 118, U.S. Pat. No. 4,477,530, U.S. Pat. No. 4,686,249, U.S. Pat. No. 4,510,275, U.S. Pat. No. 4,122,055, U.S. Pat. No. 4,385,138, WO 96/37561).

These so-called powder slurries are stable aqueous dispersions of powder coating materials. The first powder slurries were prepared by suspending powder coating materials in water. In their case the particle size of the powder coating resin particles was 0.5–80 $\mu$m. Coating formulations having a solids content in the range of 20–70% could be realized. In contrast to water-based coating materials, the addition of organic solvents as leveling agents is unnecessary with powder slurries since following application of the coating material the coating particles are readily able to stretch out through the aqueous phase. This is possible since at this point in time the resin particles are in a relatively low-viscosity medium and so possess sufficient mobility. In the course of the subsequent stoving process, the binders and crosslinker particles react with one another, so that this mobility is lost as the development of the network increases. Following the initial drying of a powder slurry, it can be regarded in simplified terms like a powder coating material. In terms of the particle size of the resins, however, the systems are markedly different from one another, which in connection with the application of powder slurries is manifested in a lower coat thickness (20–45 $\mu$m) of the stoved coating. The advantage of powder coating materials, namely the temporal separation between the melting of the resin particles to form a smooth film and the subsequent reaction to form a coherent network, is therefore also found in powder slurry systems.

Powder slurries and their preparation are the subject of numerous publications and patent applications. For instance, DE-A 2 140 843 describes the preparation of a powder coating material by spraying or squirting a paint into water and separating and drying the precipitated powder. Alternatively to this preparation process, attempts have been made to convert powder coating materials into powder slurries by mechanical precomminution followed by fine wet grinding in water. U.S. Pat. No. 4,268,542, moreover, discloses a process in which a powder coating slur is used which is very suitable for the coating of automobiles. In this case, first a conventional powder coat is applied to the body and the clearcoat slurry is applied as a second coat. In the case of this clearcoat slurry it is necessary to operate at high stoving temperatures (more than 160° C.).

U.S. Pat. No. 5,379,947 describes a powder slurry system for the coating of automobiles which is based on a hydroxy-functional binder and on an epsilon-caprolactam-blocked isophorone diisocyanate crosslinker. Following pneumatic-electrostatic application of the powder slurry, the slurry is first dried initially at 49° C. for 10 minutes and then stoved at 177° C. for 30 minutes.

For OEM automotive finishes, it has not hitherto been common practice to employ stoving temperatures higher than 150° C., on economic grounds and owing to the color stability of the base coats. Furthermore, the fineness of the powder particles is unsatisfactory.

The preparation processes described in the above-mentioned patents relating to the powder slurry start from the micronization of solid resins. These resins are first of all mixed in a solids mixer, then homogenized in an extruder, pulverized using a mill, and finally wet-ground in water in stirred mills with the addition of various additives such as wetting agents and dispersants to the final particle size in the range of 3–20 $\mu$m.

This process not only is very complex and susceptible to faults but also leads to restrictions which must be taken into account even at the stage of binder synthesis and crosslinker synthesis. For instance, the glass transition temperature of the solid resins must not be below a certain value in order to ensure sufficient blocking resistance, which is one of the preconditions for the micronization and unproblematic storage of the pulverized resins. The upper limit on the glass transition temperature is defined by the requirement for very good leveling at low stoving temperatures, i.e., high reactivity of the binder/crosslinker combination.

The present invention has now set itself the object of providing a process for preparing an aqueous powder coating dispersion which can be applied to car bodies using the current liquid coating technology and which in particular can be stoved even at temperatures of less than 150° C.

This object is achieved by mixing a liquid melt comprising binders and crosslinking agents and, if desired, catalysts, auxiliaries and further additives such as devolatilizing agents, UV absorbers, free-radical scavengers and/or antioxidants, placing said mixture in an emulsifying apparatus preferably with the addition of water and stabilizers, and cooling and filtering the resultant emulsion.

In order to be able to obtain high-quality mixing, it is essential to the invention that, in contrast to the prior art, mixing is conducted solvent-free in the melt. Accordingly, the polymeric components are fed into the dispersing apparatus in the form of viscous resin melts.

For this purpose it is necessary to melt binders and crosslinkers. The ratio of crosslinkers to binders is from 0.6 to 1:1.4, preferably from 0.8:1 to 1:1.2. Preferably, crosslinkers and binders are heated in separate vessels. The temperature in this case is selected such that both components are melted and their viscosity permits further processing, especially conveying. The higher the temperature of the melt the lower its viscosity and the better the quality of mixing obtainable. However, a crosslinking reaction must be substantially avoided. The crosslinking reaction proceeds much more quickly at higher temperatures. Consequently, there is only a narrow temperature/time window within which the available residence time before cooling is sufficiently long and at the same time good emulsification is possible. In order to utilize this window to maximum efficiency, the binder melt and crosslinker melt are not brought together until directly before the mixing zone.

Before the components are conveyed through the unit, this unit can be heated to the desired process temperature, preferably using steam. Subsequently, the melted binder/additive mixture and the crosslinker melt are conveyed through the entire unit in preferably separate, heated lines, using pumps, and are metered into a mixer. A stoichiometric ratio of binder/additive mixture and crosslinker melt can be established by way of the volume flow of the conveying pumps. Preferably, the ratio of the OH groups of the acrylate to latent NCO groups of the hardener is from 0.6:1 to 1:1.4, with particular preference from 0.8:1 to 1:1.2.

Subsequently, the liquid mixture is immediately emulsified in water. In this procedure, an emulsifier is added to the organic phase and/or to the water. Where an aqueous emulsifier/stabilizer solution is applied, it is heated under pressure to a temperature in the vicinity of the mixing temperature and the liquid binder/crosslinker mixture is emulsified therein.

Mixing and emulsifying can be carried out in two separate machines (FIG. 2) or in one (FIG. 3) multistage machine. The second solution has distinct advantages on crosslinking grounds, since in this case the residence time at the high temperatures is minimized. Any organic solvent present can subsequently be separated from the aqueous phase directly by means of vacuum distillation at low temperatures.

Emulsification is followed immediately by a cooling step. Cooling must be carried out such that, first, there is no sticking of the disperse resin particles and, second, the residence time up to the point at which a crosslinking reaction can no longer take place is as short as possible. This aim can be achieved, for example, by using a heat exchanger, cooling by injecting cold water, or by spraying the emulsion into cold water.

In order to prevent crosslinking reactions during the mixing, emulsifying and cooling phase, the residence time from the beginning of the mixing phase to the end of the cooling phase must be kept as short as possible. It is less than 5 s, preferably less than 1 s. Consequently, continuous processes are preferred. Machines employed for this purpose include rotor-stator dispersers (toothed colloid mills or wet rotor mills, crown gear dispersers, intensive mixers), and static mixers (FIG. 1).

Figure 2:
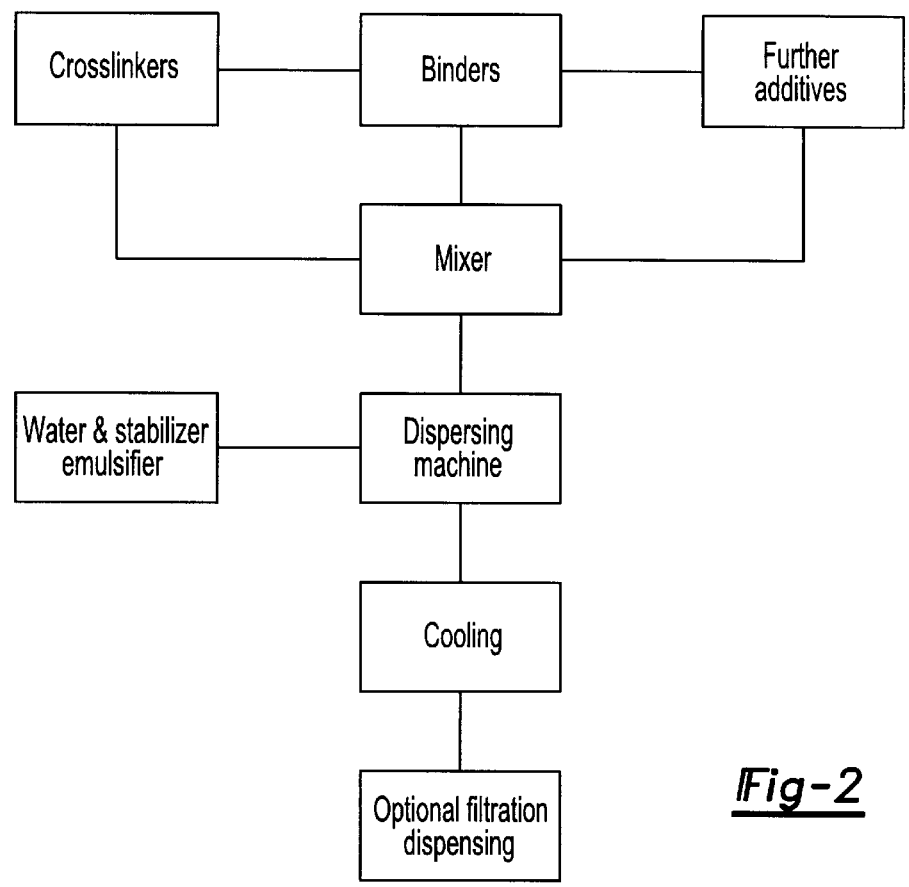
Figure 3:
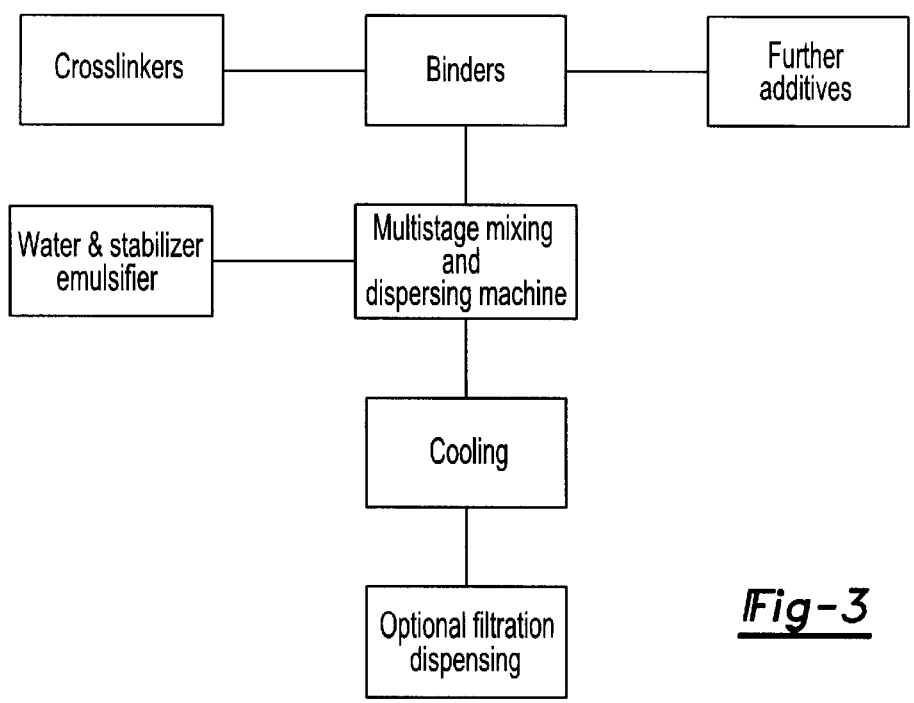

These machines can be employed in the sequences shown in FIGS. 2 and 3. in FIG. 2, the mixing step and comminution step is undertaken in two different machines. Here again, mixing is carried out using rotor-stator apparatus, and also preferably static mixers, a sufficient mixing intensity combined with minimal energy input or heating, i.e., heat input, being achieved by the choice of the process parameters. For the subsequent emulsification in water, the binder/crosslinker mixture can be sprayed into water. If sufficient finenesses are not achieved, rotor-stator apparatus or static mixers can be employed in turn. A further increase in the local power input is possible by virtue of the above-described use of a high-pressure homogenizer. In this case, the emulsion is forced through fine openings at pressures in the range from 100–1500 bar, preferably from 100 to 1000 bar and, in particular, from 100 to 200 bar, which results in a marked reduction in droplet size and therefore in greater stability of the emulsion during storage.

The micronization variants presented lead to solvent-free dispersions having the average particle sizes in the range of 100–10,000, preferably from 150 to 6000, with particular preference from 400 to 4000 and, most preferably, from 600–3500 nm, and the dispersions are therefore considerably finer than the aqueous dispersions which can be prepared by wet grinding of powder coating materials in accordance with the prior art (particle size 3–20 $\mu$m).

Although it is possible by means of the emulsion polymerization in accordance with the prior art to prepare fine polymer dispersions, these dispersions nevertheless generally have high molecular weights (>100,000 g/mol). A high molecular weight leads, however, to a low diffusion rate of the polymer particles during the stoving phase, as a result of which, in turn, there may be flow defects in the coating film. In accordance with the invention, however, the molecular weights are from 1000 to 20,000, preferably from 1000 to 10,000, with particular preference from 1500 to 6000 and, most preferably, from 1500 to 4000 g/mol, so that the highlighted disadvantage of the low diffusion rate does not occur.

Suitable binders for the powder coating dispersion of the invention are binders known per se from the prior art, examples being polyacrylates, polyurethanes, and amino resins.

It is likewise possible to use epoxy-containing binders. In accordance with the invention, accordingly, it is also possible to employ an aqueous powder coating dispersion which consists of a solid, pulverulent component A and of an aqueous component B, Component A. being a powder coating material comprising
a) at least one epoxy-containing binder containing from 30 to 45%, preferably from 30 to 35%, of glycidyl-containing monomers and, if desired, containing vinylaromatic compounds, preferably styrene,
b) at least one crosslinking agent, preferably straight-chain aliphatic dicarboxylic acids and/or carboxy-functional polyesters, and c) if desired, catalysts, auxiliaries, typical powder coating additives, such as devolatilizing agents, leveling agents, uv absorbers, free-radical scavengers and antioxidants and Component B. being an aqueous dispersion comprising a) at least one nonionic thickener and b) if desired, catalysts, auxiliaries, defoamers, dispersion auxiliaries, wetting agents, preferably carboxy-functional dispersants, antioxidants, UV absorbers, free-radical scavengers, small amounts of solvent, leveling agents, biocides and/or hygroscopic agents.

Dispersions with such a composition are used in particular for transparent powder coating materials.

Suitable epoxy-functional binders for the solid powder coating material used to prepare the dispersion are, for example, polyacrylate resins which contain epoxide groups and which can be prepared by copolymerization of at least one ethylenically unsaturated monomer containing at least one epoxide group in the molecule with at least one further ethylenically unsaturated monomer which contains no epoxide group in the molecule, at least one of the monomers being an ester of acrylic acid or methacrylic acid. Polyacrylate resins of this kind, containing epoxide groups, are known, for example, from EP-A-299 420, DE-B-22 14 650, DE-B-27 49 576, U.S. Pat. No. 4,091,048 and U.S. Pat. No. 3,781,379.

Examples of ethylenically unsaturated monomers containing no epoxide group in the molecule are alkyl esters of acrylic and metbacrylic acid which contain 1 to 20 carbon atoms in the alkyl radical, especially methyl acrylate, methyl methacrylate, ethyl acrylate, ethyl methacrylate, butyl acrylate, butyl methacrylate, 2-ethylhexyl acrylate and 2-ethylhexyl methacrylate. Further examples of ethylenically unsaturated monomers which contain no epoxide groups in the molecule are acid amides such as, for example, acrylamide and methacrylamide, vinylaromatic compounds, such as styrene, methylstyrene and vinyltoluene, nitriles, such as acrylonitrile and methacrylonitrile, vinyl halides and vinylidene halides, such as vinyl chloride and vinylidene fluoride, vinyl esters, such as vinyl acetate, and hydroxyl-containing monomers, such as hydroxyethyl acrylate and hydroxyethyl methacrylate, for example.

The polyacrylate resin containing epoxide groups usually has an epoxide equivalent weight of from 400 to 2500, preferably from 420 to 700, a number-average molecular weight (determined by gel permeation chromatography using a polystyrene standard) of from 2000 to 20,000, preferably from 300 to 10,000, and a glass transition temperature ($T_g$) of from 30 to 80, preferably from 40 to 70 and, with particular preference, from 40 to 60° C. (measured with the aid of Differential Scanning Calorimetry (DSC)). About 50° C. are very particularly preferred. It is also possible to employ mixtures of two or more acrylate resins.

The polyacrylate resin containing epoxide groups can be prepared in accordance with generally well-known methods by polymerization.

Suitable crosslinkers are all compounds known from the prior art to the person skilled in the art. Examples include carboxylic acids, especially saturated, straight-chain aliphatic dicarboxylic acids having 3 to 20 carbon atoms in the molecule, an example being 1,12-decanedioic acid. To modify the properties of the finished transparent powder coating materials it is possible, if desired, to employ other carboxyl-containing crosslinkers as well. Examples of these which may be mentioned are saturated branched or unsaturated straight-chain di- and polycarboxylic acids, and also polymers containing carboxyl groups.

Also suitable are powder coating materials comprising an epoxy-functional crosslinker and an acid-functional binder.

Examples of suitable acid-functional binders are acidic polyacrylate resins which can be prepared by copolymerizing at least one ethylenically unsaturated monomer containing at least one acid group in the molecule with at least one further ethylenically unsaturated monomer which contains no acid group in the molecule.

The binder containing epoxide groups or the crosslinker containing epoxide groups and the carboxyl-containing crosslinker or, respectively, the binder are usually employed in an amount such that there are from 0.5 to 1.5, preferably 0.75 to 1.25, equivalents of carboxyl groups per equivalent of epoxide groups. The amount of carboxyl groups present can be determined by titration with an alcoholic KOH solution.

In accordance with the invention the binder can comprise vinylaromatic compounds, especially styrene. In order to limit the danger of cracking, however, the level of such compounds is not above 35% by weight. From 10 to 25% by weight is preferred.

The solid powder coating materials comprise, if desired, one or more suitable catalysts for curing.

Suitable catalysts are phosphonium salts of organic or inorganic acids, quaternary ammonium compounds, amines, imidazole, and imidazole derivatives. The catalysts are generally employed in proportions of from 0.001% by weight to about 2% by weight, based on the overall weight of the epoxy resin and of the crosslinking agent.

Examples of suitable phosphonium catalysts are ethyltriphenylphosphonium iodide, ethyltriphenylphosphonium chloride, ethyltriphenylphosphonium thiocyanate, ethyltriphenylphosphonium acetate/acetic acid complex, tetrabutylphosphonium iodide, tetrabutylphosphonium bromide and tetrabutylphosphonium acetate/acetic acid complex. These and other suitable phosphonium catalysts are described, for example, in U.S. Pat. No. 3,477,990 and U.S. Pat. No. 3,341,580.

Examples of suitable imidazole catalysts are 2-styrylimidazole, 1-benzyl-2-methylimidazole, 2-methylimidazole and 2-butylimidazole. These and further imidazole catalysts are described, for example, in Belgian Patent No. 756,693.

The solid powder coating materials may additionally comprise, if desired, auxiliaries and additives. Examples of these are leveling agents, antioxidants, UV absorbers, free-radical scavengers, flow aids and devolatilizing agents, such as benzoin, for example. Suitable leveling agents are those based on polyacrylates, polysiloxanes and/or fluorine compounds.

Antioxidants which can be employed are reducing agents such as hydrazides and phosphorus compounds and also free-radical scavengers, e.g., 2,6-di-tert-butylphenol.

UV absorbers which can be used are preferably triazines and benzotriphenol.

2,2,6,6-Tetramethylpiperidine derivatives are free-radical scavengers which can be employed.

As a further constituent, the aqueous component B of the powder coating dispersion comprises at least one nonionic or ionic thickener a). It is preferred to employ nonionic associative thickeners a). Structural features of such associative thickeners a) are:

aa) a hydrophilic framework which ensures adequate solubility in water, and ab) hydrophobic groups which are capable of associative interaction in the aqueous medium.

Examples of hydrophobic groups employed are long-chain alkyl radicals, such as dodecyl, hexadecyl or octadecyl radicals, or alkaryl radicals, such as octylphenyl or nonylphenyl radicals, for example.

Hydrophilic frameworks employed are preferably polyacrylates, cellulose ethers or, with particular preference, polyurethanes, which comprise the hydrophobic groups as polymer units.

As hydrophilic frameworks, very particular preference is given to polyurethanes which comprise polyether chains as structural units, preferably comprising polyethylene oxide.

In the synthesis of such polyether polyurethanes, the diisocyanates and/or polyisocyanates, preferably aliphatic diisocyanates and, with particular preference, unsubstituted or alkyl-substituted 1,6-hexamethylene diisocyanate, serve to link the hydroxyl-terminated polyether building blocks with one another and to link the polyether building blocks with the hydrophobic end-group building blocks, which may, for example, be monofunctional alcohols and/or amines having the long-chain alkyl radicals or aralkyl radicals already mentioned.

The component B may additionally comprise catalysts, leveling agents, antioxidants, UV absorbers, free-radical scavengers and wetting agents. Suitable substances in this context are essentially those already listed for the component A.

Further agents which can be added to the component B are auxiliaries, defoamers, dispersion auxiliaries, biocides, solvents and neutralizing agents. Suitable defoamers are preferably modified polysiloxanes.

Examples of dispersion auxiliaries are preferably ammonium and/or metal salts of polycarboxylates.

Neutralizing agents which can be used are amines, ammonia, and metal hydroxides. In accordance with the invention, further preferred binders are hydroxy-functionalized compounds, especially hydroxyl-containing acrylates. Particular preference is given to hydroxy-functionalized polymethacrylates. Examples that may be mentioned of such polyhydroxy-functional polyacrylates (polyacrylate-polyols) are those which as comonomer units preferably comprise hydroxyalkyl esters of acrylic acid, methacrylic acid or another alpha,beta-ethylenically unsaturated carboxylic acid. These esters can be derived from an alkylene glycol, which is esterified with an acid, or they can be obtained by reacting the acid with an alkylene oxide. Hydroxyalkyl esters employed are preferably hydroxyalkyl esters of (meth)acrylic acid in which the hydroxyalkyl group contains up to 4 carbon atoms, or mixtures of these hydroxyalkyl esters.

By way of example there may be mentioned: 2-hydroxyethyl (meth)acrylate, 2- or 3-hydroxypropyl (meth)acrylate, or 4-hydroxybutyl (meth)acrylate.

Suitable crosslinkers in this case are preferably blocked isocyanates. By a controlled combination of various polyisocyanate prepolymers with different blocking agents, the reactivity of the crosslinker to polymeric binders containing active hydrogen is adjusted such that the temperature difference between film formation and crosslinking is sufficiently great.

Stabilization can be effected using the abovementioned dispersing auxiliaries or emulsifiers. Besides these, other substances can also be used.

So that the application properties and film properties of the powder slurry do not alter even after prolonged storage of the material, the binder and the crosslinker as well must not react at room temperature either with one another or with the additives that are added or the water (which functions as solvent).

The physical stability is reflected in the settling and agglomeration behavior of the resin particles in the aqueous solution. The fine dispersions of coating powder particles present in the powder slurry, or the micronized co-reactants, have the average particle sizes from 100 to 10,000, preferably from 150 to 6000, with particular preference from 400 to 4000, most preferably from 800 to 3500 nm and have molecular weights from 1000 to 20,000, preferably from 1000 to 10,000, with particular preference from 1500 to 6000 and, most preferably, from 1500 to 4000 g/mol; the fine dispersions are unstable without appropriate surface-active substances and would therefore lose their processing and film-forming properties as a result of particle interactions.

In every case, stabilizers are required to exhibit the following properties:
1. They should be very efficient, i.e., small added amounts should help to stabilize large amounts of dispersion material.
2. They should have a hydrophilicity which can be "switched"; i.e., the hydrophilic groups should be convertible in the solid state, by means of chemical reactions, into hydrophobic structural components.
3. They should be compatible in terms of chemical structure with the coating resin, in order to prevent impairment of the profile of properties owing to separation or incomplete buildup.

In accordance with the invention, polyurethane-based emulsifiers prepared by coaddition of hydrophilic and hydrophobic polyalcohols and polyesters with diisocyanates and amine extension are suitable, the material composition and thus the amphiphilicity, the molecular weight and the number of functional groups being varied. In this context, the amphiphilicity at the specific coating resin/water interface is set such that it is possible to achieve an effective dispersion, stable for long periods, using minimal amounts of stabilizer. The remaining functional groups are chosen in turn such that on curing they are incorporated chemically into the coating film and thus "dehydrophilicize" the emulsifier.

Alternatively, short-chain amphiphilic polyacrylates can be prepared from acrylic acid, ethylhexyl acrylate, hydroxyethyl acrylate and an anionic comonomer by transfer polymerization in lyotropic phase. In addition to urethane chemistry, these systems also permit a two-component "carboxy-epoxy" structural composition. The powder coating dispersion of the invention can be used as a pigmented coating material or in the form of a transparent coating material as a coating for base coats, preferably in the automotive industry.

The powder coating dispersions of the invention can be applied by means of the methods known from liquid coating technology. In particular, they can be applied by means of spraying processes. Also suitable are electrostatically assisted high-speed of rotation or pneumatic application.

The transparent powder coating dispersions applied to the base coat film are generally flashed off prior to stoving. This takes place judicially first at room temperature and then at slightly elevated temperature. In general, the elevated temperature is from 40 to 70° C., preferably from 50 to 65° C. Flashing off is carried out for from 2 to 10 minutes, preferably from 4 to 8 minutes at room temperature. At elevated temperature, flash off is repeated for the same period of time.

Stoving can be carried out even at temperatures of 130° C. Stoving can be conducted at from 130 to 180° C., preferably from 135 to 155° C.

In the text below the invention is described in more detail with reference to the examples:

I. Aqueous Powder Coating Dispersion Based on OH Acrylate/Block Polyisocyanate Prepared by Dispersing a Powder Coating Material in Water and Subsequently Adjusting the Particle Size by Wet Grinding in a Sand Mill.

1.) Preparing the Acrylate Resin 40 parts of xylene are introduced as an initial charge and heated to 130° C. The following are metered into the initial charge over the course of 4 h at 130° C. by way of two separate feeds: initiator: 4.5 parts of TBPEH: (tert-butyl perethylhexanoate) mixed with 4.86 parts of xylene, and: monomers: 15 parts of styrene, 20 parts of n-butyl methacrylate, 30 parts of cyclohexyl methacrylate, 35 parts of 2-hydroxyethyl methacrylate. The mixture is subsequently heated to 170° C. and the solvent is stripped off under reduced pressure at <100 mbar.

2.) Preparing the Transparent Powder Coating Material 56.07parts of acrylate resin (OH content 4.58%), 20.93 parts of Vestanat B 1358/100 (NCO content 12.3%, hardener), 2 parts of Tinuvin 1130 (UV absorber), 0.9 part of Tinuvin 144 (HALS), 0.4 part of Additol XL 490 (leveling agent), 0.4 part of Benzoin (devolatilizing agent) and 0.5 part of dibutyltin oxide (catalyst) are intimately mixed on a Henschel fluid mixer, the mixture is extruded on a Buss PLK 46 extruder, and the extrudate is ground on a Hosohawa ACM2 mill and screened through a 125 μm sieve.

3.) Preparing the Dispersion

In 61 parts of deionized water, 1.6 parts of Orotan 731 K (dispersing auxiliary), 0.2 part of Troykyd 777 (defoamer), 0.4 part of Surfynol TMN 6 (wetting agent), 1.8 parts of Acrysol RM8 (Rohm & Haas); nonionic associative thickener based on polyurethane) and 35 parts of the transparent powder coating material prepared under 2.) are dispersed. The material is ground in a sand mill for 2 h. The average particle size measured at the end is 3.6 μm. The material is filtered through a 50 μm filter and, finally, 0.5% of Byk 345 (leveling agent) is added.

4.) Applying the Dispersion

The slurry is applied using a cup gun to steel panels coated with water-based coating material. The panel is flashed off at room temperature for 5 minutes and at 60° C. for 5 minutes. The panel is subsequently stoved for 30 minutes at a temperature of 150° C. With a film thickness of 40 μm, a highly glossy clearcoat film with MEK resistance (>100 double strokes) is produced. The clearcoat film exhibits good condensation stability.

II. Powder Slurries Prepared by Mixing Melts and Then Dispersing Them in Water

1.) The Preparation of the Powder Slurry Takes Place Preferably as Follows:

In vessel 1 the crosslinker, veutanat B 1358/100, and in vessel 2 a mixture of 56.07 parts of the hydroxy-functional polymethacrylate described under section I 1.), 2 parts of Tinuvin 1130 (UV absorber), 0.9 part of Tinuvin 144 (HALS), 0.4 part of Additol XL 490 (leveling agent), 0.4 part of Benzoin (devolatilizer), 0.5 part of dibutyltin oxide (catalyst) are heated to a process temperature of 139° C. The process temperature is chosen such that both components are melted and their viscosity permits further processing, especially conveying.

Prior to the conveying of the components through the unit said unit is heated to the process temperature by means of steam. Then the melted binder/additive mixture and the crosslinker melt are conveyed through the entire unit in separate, heated lines and are metered into a mixer. The pumps convey volumetrically. A stoichiometric ratio of binder/additive mixture and crosslinker melt (OH groups of the acrylate/latent NCO groups of the hardener=1:1) is established by way of the volume flow of the pumps. In a mixing chamber (static mixer, from Sulzer GmbH) the melts are mixed in a molecularly disperse manner within a very short time (<5 s). The resultant homogeneous melt, which still has a temperature above the melting point of the components, is conveyed into an initial emulsifying zone. In the initial emulsifying zone, an aqueous solution of 61 parts of deionized water, 1.6 parts of Orotan 731 K (dispersing auxiliary), 0.2 part of Troykyd 777 (defoamer) and 0.4 part of Surfynol TMN 6 (wetting agent), is metered in using a volumetrically conveying pump. Before metering, the aqueous solution has been heated to the process temperature of 139° C. in a pressure-resistant vessel 3. An initial emulsion is then generated by inputting energy with a rotor-stator system or static mixer.

In the course of this procedure, the resin/crosslinker melt forms droplets (disperse phase) in the aqueous solution (continuous phase). In a further zone, at energy inputs of between $10^7$ and $10^8$ J/m$^3$, the droplets of the initial emulsion are comminuted to a particle size of between 1000 and 3000 nm. The energy input of the rotor-stator system can be changed by altering the gap width between rotor and stator, by the rotor geometries, and by the rotary speed.

Following dispersion, the dispersions are cooled by injection of cold water. The amounts of deionized water for initial emulsification and for cooling the dispersions are such that the dispersion present has a solids content of about 35%. Finally, 1.8 parts of Acrysol RM8 (thickener, based on a solids content of 35%) are added to the dispersion, which is then filtered through a 50 μm filter.

2.) Applying the Dispersion

The slurry is applied by means of a cup gun to steel panels coated with water-based coating material. The panel is flashed off at room temperature for 5 minutes and at 60° C. for 5 minutes. Subsequently, the panel is stoved for 30 minutes at a temperature of 150° C. With a film thickness of 40 μm, a highly glossy clearcoat film having MEK resistance (>100 double strokes) is produced. The clearcoat film exhibits good condensation stability.

What is claimed is:

1. A process for preparing an aqueous powder coating dispersion, comprising mixing a liquid melt comprising
binders, crosslinking agents and optionally one or more additives selected from the group consisting of catalysts, auxiliaries, devolatilizing agents, leveling agents, UV absorbers, free-radical scavengers, antioxidants, and mixtures thereof;

emulsifying the liquid melt in water and stabilizers, and cooling and filtering the resultant emulsion, wherein the mixing of the melt takes place within a period of less than 5 seconds.

2. The process of claim 1, further comprising melting the binders and additives separately from the crosslinking agents to form a binder/additive melt and a crosslinking agent melt, mixing the binder/additive melt with the crosslinking agent melt to form a mixed melt, and, dispersing the mixed melt into an aqueous composition.

3. The process claim 2, wherein the ratio of binder to crosslinker in the mixed melt is from 0–6:1 to 1:1.4.

4. The process of claim 2, wherein the mixing of the binder/additive melt and the crosslinking agent melt takes place within a period of less than 5 seconds.

5. The process of claim 1, wherein the mixture is forced through fine openings at pressures from 100 to 1500 bar.

6. The process of claim 1, wherein the particles of the emulsion are comminuted in a further process step prior to cooling.

7. The process of claim 1, wherein the cooling step is carried out by a member selected from the group consisting of using a heat exchangers, injecting water into the emulsion, spraying the emulsion into water, and combinations thereof.

8. The process of claim 1, wherein the emulsifying apparatus is selected from the group consisting of rotor-stator dispersing apparatus, static mixers, toothed colloid mills, wet rotor mills, crown gear dispersers, intensive mixers, and high-pressure homogenizers.

9. The process of claim 1, wherein the binder comprises one or more resins selected from the group consisting of polyacrylate resins, polyurethane resins, amino resins, epoxy acrylates, hydroxy-functionalized acrylates, and mixtures thereof.

10. An aqueous powder coating dispersion produced by the process of claim 1.

11. The aqueous powder coating dispersion of claim 10, wherein the average size of the particles of the emulsified melt are from 100 to 10,000 nm, and the molecular weight is between 1000 and 20,000.

12. A process for coating a substrate, comprising coating a substrate with the aqueous powder coating dispersion of claim 10.

* * * * *